United States Patent
Orihashi et al.

(10) Patent No.: US 12,065,056 B2
(45) Date of Patent: Aug. 20, 2024

(54) ELECTRIC POWER SYSTEM

(71) Applicant: TOYOTA JIDOSHA KABUSHIKI KAISHA, Toyota (JP)

(72) Inventors: Nobuyuki Orihashi, Toyota (JP); Shigeki Kinomura, Toyota (JP); Tamaki Ozawa, Toyota (JP); Chiaki Kanda, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 340 days.

(21) Appl. No.: 17/573,698

(22) Filed: Jan. 12, 2022

(65) Prior Publication Data

US 2022/0242271 A1    Aug. 4, 2022

(30) Foreign Application Priority Data

Jan. 29, 2021    (JP) ................................. 2021-013420

(51) Int. Cl.
*B60L 53/68* (2019.01)
*B60L 55/00* (2019.01)
*H02J 3/38* (2006.01)

(52) U.S. Cl.
CPC ............. *B60L 53/68* (2019.02); *B60L 55/00* (2019.02); *H02J 3/381* (2013.01); *G05B 2219/2639* (2013.01)

(58) Field of Classification Search
CPC .......... B60L 53/68; B60L 53/63; B60L 53/66; B60L 50/00; B60L 55/00; H02J 3/381; G05B 2219/2639
See application file for complete search history.

(56) References Cited

U.S. PATENT DOCUMENTS 7,949,435 B2 *  5/2011  Pollack .................. B60L 53/20
                                                 315/80
9,960,637 B2    5/2018  Sanders et al.
(Continued)

FOREIGN PATENT DOCUMENTS

| JP | 2012-118982 A | 6/2012 |
| JP | 2019-135901 A | 8/2019 |
| WO | WO 2019/093009 A1 | 5/2019 |

OTHER PUBLICATIONS

Himadry Shekhar Das, et al., "Fuel Cell Hybrid Electric Vehicles: A Review on Power Conditioning Units and Topologies", Renewable and Sustainable Energy Reviews, Elseviers Science, New York, NY, US, vol. 76, Mar. 18, 2017, pp. 268-291.

*Primary Examiner* — Mong-Shune Chung
(74) *Attorney, Agent, or Firm* — Finnegan, Henderson, Farabow, Garrett, and Dunner, LLP

(57) ABSTRACT

A controller of an EMS server determines whether it has received a supply and demand request from a power transmission and distribution utility server. When having received the supply and demand request, the controller determines whether the supply and demand request is for requesting an increase in power demand or for requesting an increase in power demand. The controller decomposes the supply and demand request into first to third requests. The controller creates a negawatt DR execution plan or a posiwatt DR execution plan based on a determination result of S3. The controller allocates power adjustment resources to the first to third requests in consideration of responsiveness of each of the power adjustment resources. The controller transmits the first to third request signals to target power adjustment resources in accordance with the execution plan.

2 Claims, 6 Drawing Sheets

(56) References Cited

U.S. PATENT DOCUMENTS

| | | | |
|---|---|---|---|
| 2007/0282495 A1* | 12/2007 | Kempton | B60L 8/00 701/22 |
| 2012/0136496 A1 | 5/2012 | Black et al. | |
| 2013/0179135 A1* | 7/2013 | Kang | B60L 55/00 703/8 |
| 2013/0226637 A1* | 8/2013 | Bozchalui | B60L 53/63 705/7.12 |
| 2022/0149619 A1* | 5/2022 | Harsamizadeh Tehrani | H02J 7/0048 |
| 2023/0006442 A1* | 1/2023 | Kudo | H02J 3/46 |

\* cited by examiner

ELECTRIC POWER SYSTEM

This nonprovisional application is based on Japanese Patent Application No. 2021-013420 filed on Jan. 29, 2021 with the Japan Patent Office, the entire contents of which are hereby incorporated by reference.

BACKGROUND

Field

The present disclosure relates to an electric power system.

Description of the Background Art

Japanese Patent Laying-Open No. 2019-135901 discloses a demand response system that controls a device included in a demand side to perform a demand response in order to reduce an amount of electric power supplied from a power grid to the demand side. Upon acceptance of a request to perform a demand response from a power company or the like, the demand response system creates a plan of the demand response and performs the demand response.

SUMMARY

In recent years, electric-powered vehicles such as battery electric vehicles (BEVs) and fuel cell electric vehicles (FCEVs) have become popular. In order to further stabilize a power grid, it is desirable to utilize the BEV and FECV as power adjustment resources. The BEV and FCEV can be utilized as power adjustment resources via electric vehicle supply equipment (EVSE).

However, the BEV and FCEV are different in responsiveness to a demand response. For example, the FCEV requires a longer time to start electric power supply from the receipt of a demand response (has lower responsiveness) than the BEV. To appropriately perform a demand response, it is desired to perform a demand response reflecting the responsiveness of each of the power adjustment resources.

The present disclosure has been made to solve the above problem. An object of the present disclosure is to perform a demand response reflecting responsiveness of each of power adjustment resources.

(1) An electric power system according to an aspect of the present disclosure includes a plurality of power adjustment resources electrically connectable to a power network, and a power management apparatus that performs a demand response requesting adjustment of power supply and demand to the power network in response to a supply and demand request from a power grid. The power management apparatus decomposes the supply and demand request into a first request signal and a second request signal higher in frequency than the first request signal, and allocates power adjustment resources that respond to the first request signal and the second request signal in accordance with responsiveness of each of the plurality of power adjustment resources to the demand response.

With the above configuration, the supply and demand request from the power grid is decomposed into the first request signal and the second request signal, and power adjustment resources that respond to the first request signal and the second request signal are allocated in accordance with responsiveness of each of the power adjustment resources to a demand response. The power adjustment resources are different from one another in responsiveness to a demand response depending on their structure, specifications, or the like. Accordingly, the demand response can be performed as appropriate by allocating power adjustment resources in accordance with the responsiveness.

(2) In one embodiment, the plurality of power adjustment resources include a battery electric vehicle, a fuel cell electric vehicle, and a charging facility. The battery electric vehicle and the fuel cell electric vehicle are electrically connected to the power network via the charging facility. The battery electric vehicle includes a first battery and is configured to supply electric power to the power network and receive electric power from the power network by charging and discharging of the first battery. The fuel cell electric vehicle includes a hydrogen power generation system and is configured to supply electric power to the power network by power generation by the hydrogen power generation system. When the supply and demand request is for requesting a reduction in power demand, the power management apparatus allocates the fuel cell electric vehicle as a power adjustment resource that responds to the first request signal and allocates the battery electric vehicle as a power adjustment resource that responds to the second request signal.

The fuel cell electric vehicle generates electric power by a chemical reaction in the hydrogen power generation system. The fuel cell electric vehicle is thus lower than a battery electric vehicle that supplies electric power stored in a battery in responsiveness to a demand response requesting a reduction in power demand. With the above configuration, the fuel cell electric vehicle is allocated as the power adjustment resource that responds to the first request signal, and the battery electric vehicle is allocated as the power adjustment resource that responds to the second request signal. Accordingly, an appropriate demand response can be performed in accordance with the responsiveness of each of the power adjustment resources.

(3) In one embodiment, the charging facility includes a second battery and is configured to supply electric power to the power network and receive electric power from the power network by charging and discharging of the second battery. The power management apparatus decomposes fluctuations in power demand of the power grid into the first request signal, the second request signal, and a third request signal higher in frequency than the second request signal. When the supply and demand request is for requesting a reduction in power demand, the power management apparatus allocates the fuel cell electric vehicle as a power adjustment resource that responds to the first request signal, allocates the battery electric vehicle as a power adjustment resource that responds to the second request signal, and allocates the charging facility as a power adjustment resource that responds to the third request signal.

With the above configuration, the supply and demand request from the power grid is decomposed into the first request signal, the second request signal, and the third request signal. The battery electric vehicle generally performs prescribed processing such as information exchange and relay fusing check between the charging facility and the battery electric vehicle before starting power supply or charging, and accordingly, a prescribed time is required before starting power supply or charging. The charging facility on which the second battery is mounted thus has higher responsiveness to a demand response requesting a reduction in power demand than the battery electric vehicle. The fuel cell electric vehicle is allocated as the power adjustment resource that responds to the first request signal, the battery electric vehicle is allocated as the power adjustment resource that responds to the second request signal, and the charging facility is allocated as the power adjustment resource that responds to the third request signal. Accordingly, an appropriate demand response can be performed in accordance with the responsiveness of each of the power adjustment resources.

(4) In one embodiment, the fuel cell electric vehicle further includes a third battery and is configured to receive electric power from the power network by charging of the third battery. When the supply and demand request is for requesting an increase in power demand, the power management apparatus allocates the battery electric vehicle and the fuel cell electric vehicle as power adjustment resources that respond to the first request signal and the second request signal, and allocates the charging facility as a power adjustment resource that responds to the third request signal.

When the fuel cell electric vehicle can receive electric power from the power network by charging of the third battery, the fuel cell electric vehicle has responsiveness to the demand response requesting an increase in power demand, which is equal to that of the battery electric vehicle. With the above configuration, the battery electric vehicle and the fuel cell electric vehicle are allocated as the power adjustment resources that respond to the first request signal and the second request signal, and the charging facility is allocated as the power adjustment resource that responds to the third request signal. Accordingly, an appropriate demand response can be performed in accordance with the responsiveness of each of the power adjustment resources.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
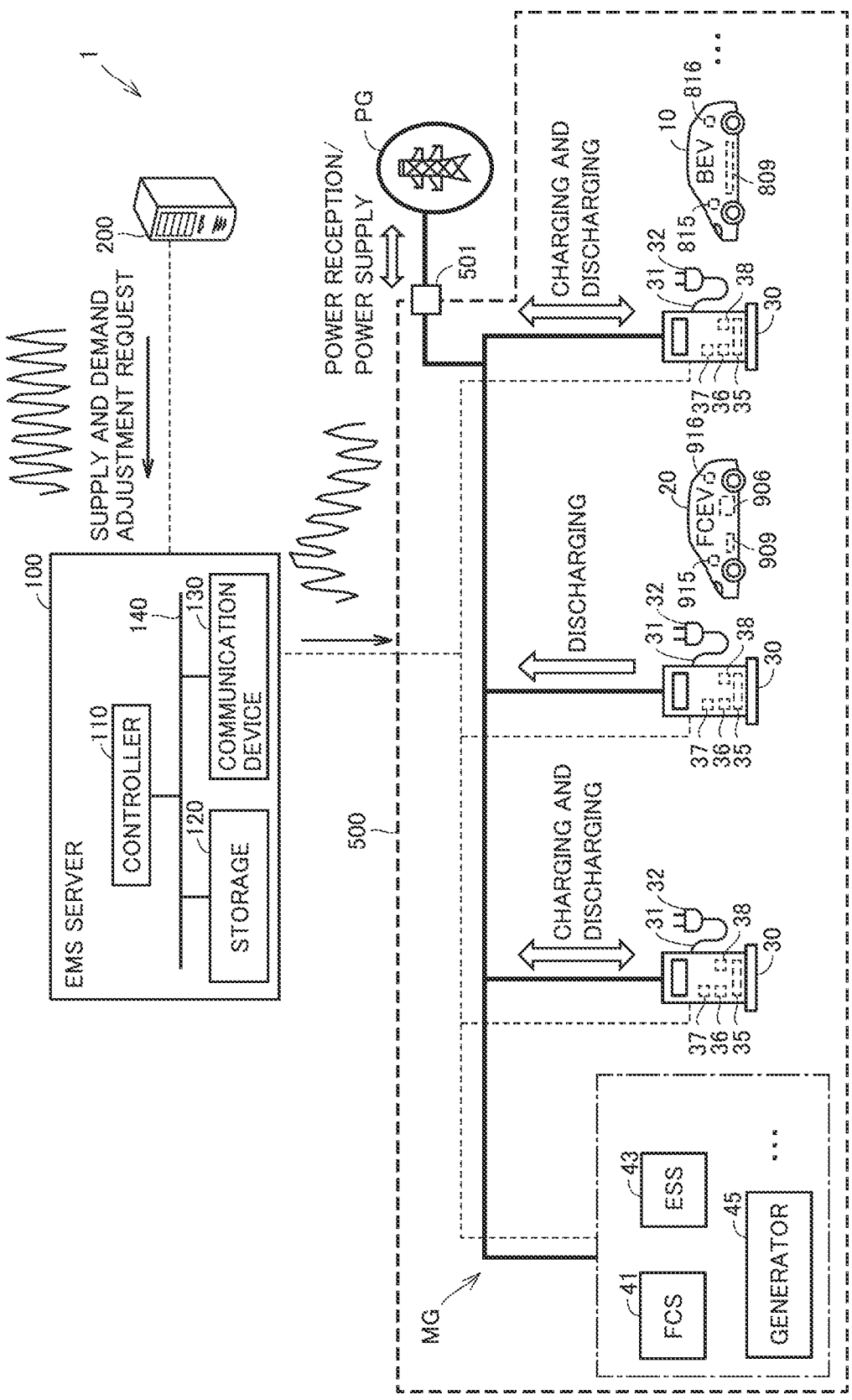
FIG. 1 shows a schematic configuration of an electric power system according to an embodiment.

An embodiment of the present disclosure will be described below in detail with reference to the drawings. The same or corresponding elements in the drawings have the same reference characters allotted, and description thereof will not be repeated.

Embodiment

<Overall Configuration of Electric Power System>

FIG. 1 shows a schematic configuration of an electric power system 1 according to an embodiment. Electric power system 1 includes a power grid PG, a microgrid MG, an energy management system (EMS) server 100, a power transmission and distribution utility server 200, a power adjustment resource group 500, and a power reception and transformation facility 501. EMS server 100 may be, for example, a community energy management system (CEMS) server, a building energy management system (BEMS) server, or a factory energy management system (FEMS) server. The present embodiment will describe an example in which EMS server 100 is the CEMS server.

Microgrid MG is a power network that supplies electric power to a region as a whole. Supply and demand of electric power in microgrid MG is managed by EMS server 100. A power line for networking of a plurality of power adjustment resources in microgrid MG may be a private power line. Microgrid MG is configured to be connected to and disconnected from power grid PG.

Power transmission and distribution utility server 200 is a computer that manages supply and demand of power grid PG. Power grid PG is a power network constructed by a power plant (not shown) and a power transmission and distribution facility. In the present embodiment, a power company serves as a power generation utility and a power transmission and distribution utility. The power company corresponds to a general power transmission and distribution utility, and maintains and manages power grid PG (commercial power grid). The power company corresponds to a manager of power grid PG. Power transmission and distribution utility server 200 belongs to the power company.

Power reception and transformation facility 501 is provided at a point of interconnection (power reception point) of microgrid MG and is configured to switch between connection (parallel in) and disconnection (parallel off) between power grid PG and microgrid MG. Power reception and transformation facility 501 is located at a point of connection between microgrid MG and power grid PG.

When microgrid MG is performing an interconnected operation while being connected to power grid PG, power reception and transformation facility 501 receives alternating-current (AC) power from power grid PG, down-converts the received power, and supplies the down-converted power to microgrid MG. When microgrid MG is performing an isolated operation while being disconnected from power grid PG, electric power is not supplied from power grid PG to microgrid MG. Power reception and transformation facility 501 includes a high-voltage-side (primary-side) switch (e.g., a section switch, an isolator, a breaker, and a load switch), a transformer, a protection relay, a measurement instrument, and a controller. EMS server 100 is configured to receive information (e.g., a power waveform) on microgrid MG from power reception and transformation facility 501 and indicate connection and disconnection to power reception and transformation facility 501.

EMS server 100 includes a controller 110, a storage 120, and a communication device 130. Controller 110, storage 120, and communication device 130 are connected to one another by a bus 140. Controller 110 may be a central processing unit (CPU). Storage 120 is configured to store various types of information. Storage 120 stores a program to be executed by controller 110, as well as information (e.g., a map, a mathematical expression, and various parameters) to be used by a program. Communication device 130 includes various communication interfaces (I/Fs). EMS server 100 is configured to communicate with each of power transmission and distribution utility server 200 and power adjustment resource group 500 via communication device 130. A communications protocol may be OpenADR.

EMS server 100 controls power adjustment resource group 500 connected to microgrid MG to function as a virtual power plant (VPP). More specifically, EMS server 100 remotely controls power adjustment resource group 500 as being integrated as if power adjustment resource group 500 functioned as a single power plant according to an energy management technology that makes use of the Internet of Things (IoT).

Power adjustment resource group 500 includes a plurality of power adjustment resources that can be electrically connected to microgrid MG. EMS server 100 is configured to manage the plurality of power adjustment resources included in power adjustment resource group 500. EMS server 100 may perform a demand response (DR) to power adjustment resource group 500 when it is requested to adjust supply and demand of power grid PG from power transmission and distribution utility server 200. EMS server 100 may perform a DR to power adjustment resource group 500 in order to adjust supply and demand of microgrid MG.

Power adjustment resource group 500 includes a BEV 10, an FCEV 20, EVSE 30, a fuel cell system (FCS) 41, an energy storage system (ESS) 43, and a generator 45.

FCS 41 includes a stationary fuel cell that generates electric power by a chemical reaction between hydrogen and oxygen. FCS 41 is connected to a hydrogen tank (not shown). The hydrogen tank is connected to a hydrogen generator (not shown). FCS 41 is configured to generate electric power by using hydrogen supplied from the hydrogen tank and supply the generated electric power to microgrid MG. The hydrogen generator can adopt any known method. For example, a method such as a by-product hydrogen method, water electrolysis, a fossil fuel reforming method, a biomass reforming method, or an iodine-sulfur (IS) process may be adopted for the hydrogen generator. The hydrogen generator may generate hydrogen by using electric power supplied from microgrid MG. EMS server 100 may control the hydrogen generator such that a remaining amount of hydrogen in the hydrogen tank does not fall below a prescribed value.

ESS 43 includes a stationary battery configured to be chargeable from and dischargeable to microgrid MG. For example, the battery included in ESS 43 may be a lithium ion battery, a lead-acid battery, a nickel metal hydride battery, a redox flow battery, or a sodium-sulfur (NAS) battery.

Generator 45 is a stationary generator that generates electric power by using fossil fuel. Generator 45 may be, for example, a gas turbine generator or a diesel generator. Generator 45 may be used as an emergency power supply.

Any number of each of FCSs 41, ESSs 43, and generators 45 may be included in power adjustment resource group 500.

EMS server 100 performs a demand response (DR) that requests power adjustment resource group 500 to adjust electric power supply and demand, in response to a request for supply and demand adjustment (supply and demand request) of power grid PG from power transmission and distribution utility server 200, thus contributing to supply and demand adjustment of power grid PG. Generally, for example, when requested to perform supply and demand adjustment from power transmission and distribution utility server 200, EMS server 100 creates a DR execution plan for each power adjustment resource (a power adjustment resource that expresses participation in the DR) of power adjustment resource group 500, and sends a request signal based on the execution plan to each power adjustment resource.

In recent years, electric-powered vehicles such as BEVs and FCEVs have become popular. In order to further stabilize supply and demand of power grid PG, it is desirable to utilize an electric-powered vehicle, and also an EVSE, as power adjustment resources.

In the present embodiment, thus, power adjustment resource group 500 includes BEV 10, FCEV 20, and EVSE 30. BEV 10 and FCEV 20 function as power adjustment resources as being electrically connected to EVSE 30. As a charging connector of EVSE 30 is inserted into an inlet (812 of FIG. 4) of BEV 10, EVSE 30 and BEV 10 are electrically connected to each other. As a charging connector of EVSE 30 is inserted into an outlet (912 of FIG. 5) of FCEV 20, EVSE 30 and FCEV 20 are electrically connected to each other. Though a configuration of BEV 10 will be described below in detail, as BEV 10 is connected to EVSE 30, BEV 10 can receive electric power supplied from microgrid MG to charge a battery 809 and supply electric power stored in the battery to microgrid MG, in response to a DR request from EMS server 100. Though a configuration of FCEV 20 will be described below in detail, as FCEV 20 is connected to EVSE 30, FCEV 20 can supply electric power generated by an FC stack 906 mounted on FCEV 20 to microgrid MG, in response to a DR request from EMS server 100.

Figure 2:
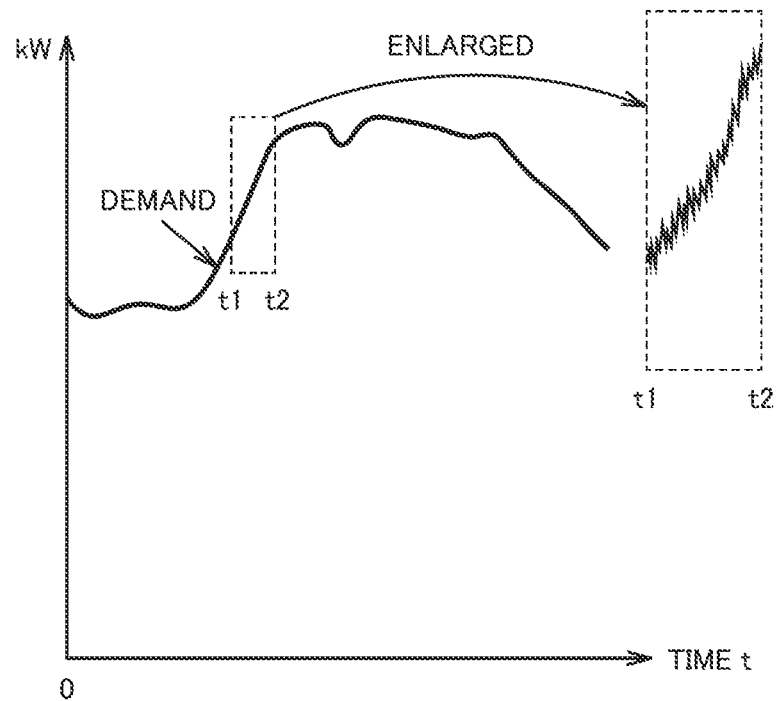
FIG. 2 is a diagram (No. 1) for illustrating a supply and demand request.
Figure 3:
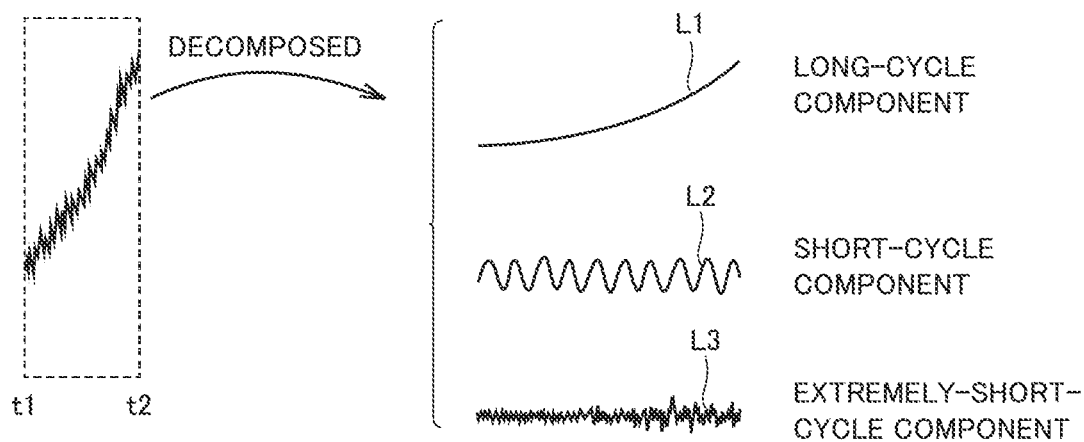
FIG. 3 is a diagram (No. 2) for illustrating a supply and demand request.

Herein, fluctuations in power demand in power grid PG are indicated by combination of a long-cycle component, a short-cycle component, and an extremely-short-cycle component which are different from one another in fluctuation cycle. Thus, a supply and demand request from power transmission and distribution utility server 200 along with fluctuations in power demand in power grid PG can be decomposed into a long-cycle component, a short-cycle component, and an extremely-short-cycle component which are different from one another in fluctuation cycle. FIGS. 2 and 3 are diagrams for illustrating a supply and demand request.

Referring first to FIG. 2, FIG. 2 shows example fluctuations in power demand in power grid PG. For example, when attention is paid to a time t1 to a time t2, power demand has increased. It is assumed that in this case, power transmission and distribution utility server 200 makes a supply and demand request requesting a reduction in power demand to EMS server 100. It is further assumed in the present embodiment that a supply and demand request to reduce an amount of increase in power demand from time t1 to time t2 is transmitted from power transmission and distribution utility server 200 to EMS server 100 for easy understanding. Upon receipt of this supply and demand request, EMS server 100 outputs, to power adjustment resource group 500, a demand response (negawatt DR) requesting a reduction in power demand (including power supply to power grid PG).

Referring to FIG. 3, a supply and demand request (fluctuations in power demand of power grid PG) from time t1 to time t2 is decomposed into a long-cycle component L1, a short-cycle component L2, and an extremely-short-cycle component L3 as shown in FIG. 3. Long-cycle component L1 has, for example, a fluctuation cycle of approximately several tens of minutes. Short-cycle component L2 has, for example, a fluctuation cycle of approximately several minutes. Extremely-short-cycle component L3 has, for example, a fluctuation cycle of approximately several tens of seconds. In other words, the fluctuation cycle of long-cycle component L1 is the longest, the fluctuation cycle of short-cycle component L2 is the second longest, and the fluctuation cycle of extremely-short-cycle component L3 is the shortest. BEV 10, FCEV 20, and EVSE 30 are different from one another in a time (responsiveness) required to start power supply from the receipt of negawatt DR from EMS server 100. Though described below in detail, for example, BEV 10 can respond to a request for negawatt DR corresponding to each of long-cycle component L1 and short-cycle component L2 but fails to respond to a request for negawatt DR corresponding to extremely-short-cycle component L3. FCEV 20 can respond to a request for negawatt DR corresponding to long-cycle component L1 but fails to respond to a request for negawatt DR corresponding to each of short-cycle component L2 and extremely-short-cycle component L3. EVSE 30 can respond to a request for negawatt DR corresponding to each of long-cycle component L1, short-cycle component L2, and extremely-short-cycle component L3. In order to further stabilize supply and demand of power grid PG, it is desirable to perform a demand response reflecting the responsiveness of each of power adjustment resources. The configuration and responsiveness of each of BEV 10, FCEV 20, and EVSE 30 will be descried below in order.

<EVSE>

Referring again to FIG. 1, EVSE 30 is electrically connected to microgrid MG to exchange electric power with microgrid MG. EVSE 30 includes a battery 35, a communication device 36, a power converter 37, and a controller 38. EVSE 30 also includes a charging cable 31. A charging connector 32 is provided at the tip of charging cable 31. The charging connector is connectable to an inlet of BEV 10 (FIG. 4) or an outlet of FCEV 20 (FIG. 5).

Battery 35 is, for example, a lithium ion battery, a lead-acid battery, a nickel metal hydride battery, a redox flow battery, or a NAS battery.

Communication device 36 is configured to communicate with EMS server 100. Communication device 36 is also configured to communicate with an electric-powered vehicle (BEV 10 or FCEV 20 in the present embodiment) connected thereto through the charging cable.

Power converter 37 is configured to convert AC power supplied from microgrid MG into direct-current (DC) power for charging battery 809 of BEV 10 or battery 35. Power converter 37 is also configured to convert DC power supplied from BEV 10, FCEV 20, or battery 35 into AC power to be supplied to microgrid MG. Power converter 37 includes, for example, a converter, an inverter, an isolation transformer, a rectifier, or the like.

Controller 38 includes a processor, a memory, and an I/O port, which are not shown. Controller 38 controls components of EVSE 30, such as communication device 36 and power converter 37.

Upon receipt of a demand response (negawatt DR) requesting an increase in power demand from EMS server 100, for example, controller 38 confirms that the SOC of battery 35 has not reached a lower-limit SOC (or confirms that the voltage across battery 35 has not reached a lower-limit voltage), and immediately starts supplying power to microgrid MG in response to the negawatt DR. EVSE 30 can thus respond to requests corresponding to long-cycle component L1, short-cycle component L2, and extremely-short-cycle component L3.

Upon receipt of a demand response (posiwatt DR) requesting an increase in power demand from EMS server 100, for example, controller 38 confirms that the SOC of battery 35 has not reached an upper-limit SOC (or confirms that the voltage across battery 35 has not reached an upper-limit voltage), and immediately starts receiving power from microgrid MG in response to the posiwatt DR. EVSE 30 can thus respond to a request (first request) corresponding to long-cycle component L1, a request (second request) corresponding to short-cycle component L2, and a request (third request) corresponding to extremely-short-cycle component L3.

<BEV>

Figure 4:
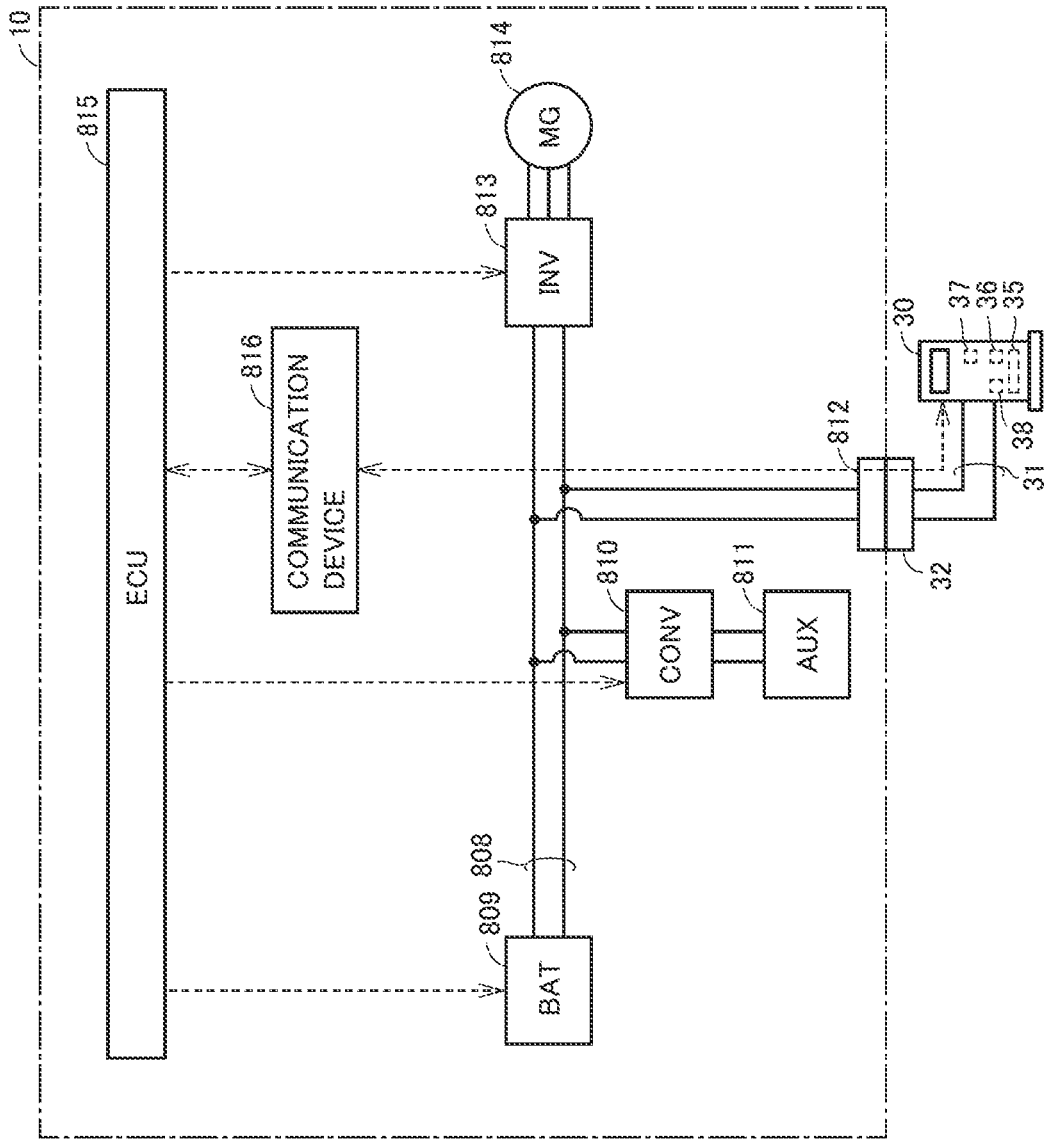
FIG. 4 schematically shows an overall configuration example of a BEV.
Figure 5:
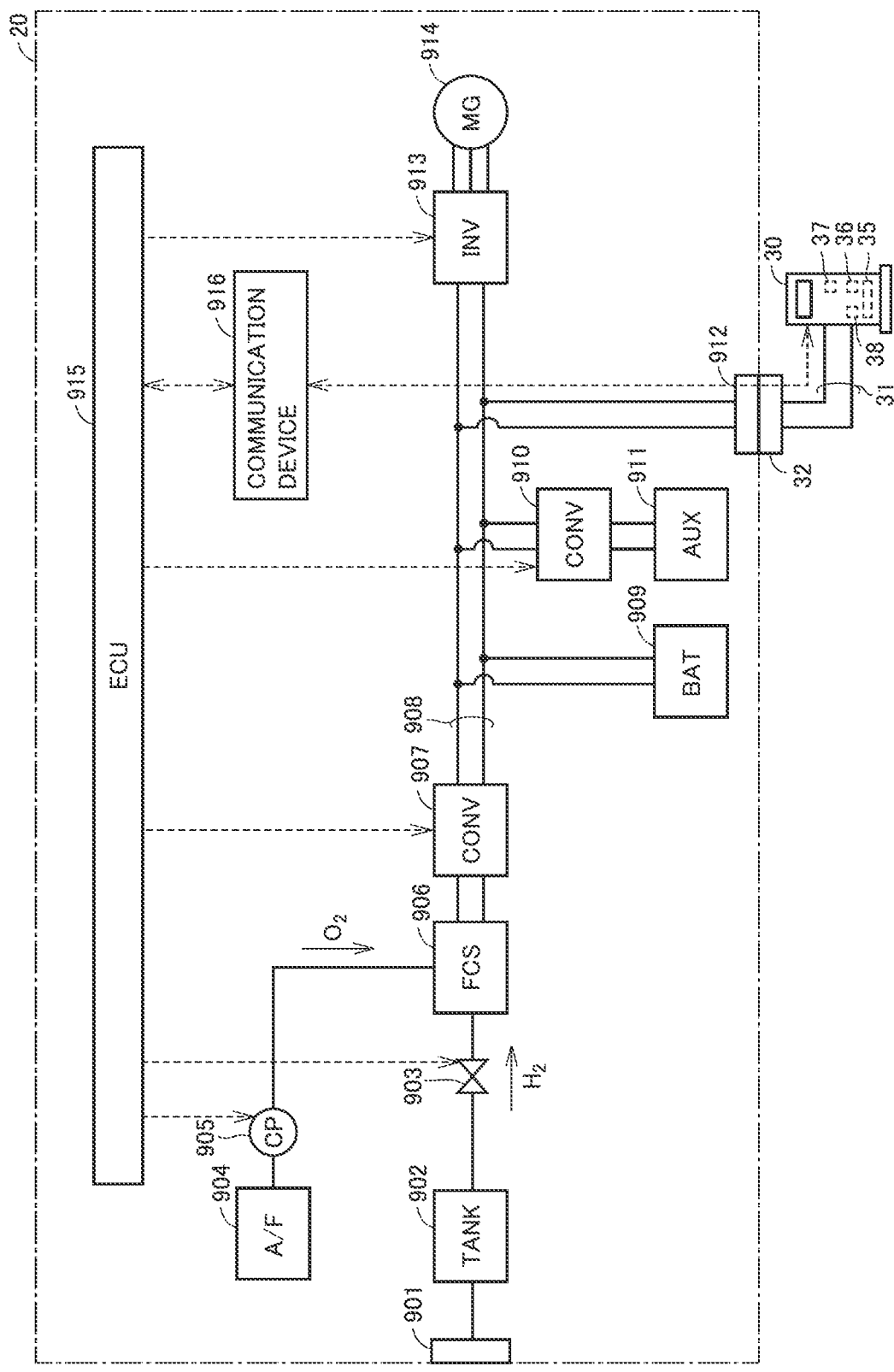
FIG. 5 schematically shows an overall configuration example of an FCEV.

FIG. 4 schematically shows an overall configuration example of BEV 10. BEV 10 includes a power line 808, a battery 809, a step-down converter 810, an auxiliary load 811, an inlet 812, an inverter 813, a motor generator 814, an electronic control unit (ECU) 815, and a communication device 816.

Battery 809 is electrically connected to power line 808. Battery 809 is, for example, a lithium ion battery or a nickel metal hydride battery. Battery 809 stores electric power for driving motor generator 814 and supplies the electric power to inverter 813. Battery 809 also receives electric power generated by motor generator 814 during braking of BEV 10 or the like to be charged.

Step-down converter 810 is electrically connected between power line 808 and auxiliary load 811. Step-down converter 810 steps down electric power transmitted on power line 808 to a prescribed voltage and outputs the stepped-down electric power to auxiliary load 811. Auxiliary load 811 corresponds to various devices that consume the electric power supplied from step-down converter 810 to be driven. Auxiliary load 811 may include lamps (such as a head lamp, a fog lamp, a cornering signal lamp, and a corner lamp), an audio device, a car navigation system, an antilock brake system (ABS), an oil pump, meters, a defogger, a wiper, and the like.

Inlet 812 is connectable with charging connector 32 provided at the tip of charging cable 31 of EVSE 30. Inlet 812 outputs the electric power received from EVSE 30 to battery 809. Battery 809 can thus be charged with the electric power from EVSE 30 (including electric power from microgrid MG) (external charging). Inlet 812 also outputs electric power of battery 809 to EVSE 30. Thus, electric power can be supplied from BEV 10 to microgrid MG (external power supply).

Inverter 813 is electrically connected between power line 808 and motor generator 814. Inverter 813 drives motor generator 814 based on a drive signal from ECU 815. Motor generator 814 is, for example, a three-phase AC synchronous motor including a rotor with an embedded permanent magnet. Motor generator 814 is driven by inverter 813 to generate a rotational driving force. The driving force generated by motor generator 814 is transmitted to driving wheels (not shown).

Communication device 816 is configured to communicate with EVSE 30 (communication device 36) electrically connected thereto via inlet 812. Communication between BEV 10 (communication device 816) and EVSE 30 (communication device 36) is performed in communication that complies with a communication protocol of a controller area network (CAN) (also referred to as "CAN communication" below). The communication between BEV 10 and EVSE 30 is not limited to CAN communication, and for example, may be performed in power line communication (PLC).

ECU 815 includes a processor, a memory, and an I/O port, which are not shown. ECU 815 controls devices that form BEV 10 based on a program stored in the memory and signals from various sensors. ECU 815 may be divided into a plurality of ECUs by function.

In the present embodiment, ECU 815 controls external power supply and external charging by BEV 10, in cooperation with EMS server 100 and EVSE 30 (controller 38 of EVSE 30). ECU 815 performs external power supply or external charging based on a demand response from EMS server 100 which is received via EVSE 30. Specifically, upon receipt of a negawatt DR, ECU 815 controls battery 809 such that output power requested for battery 809 is calculated and battery 809 outputs the calculated power, based on a negawatt DR request signal. Also, upon receipt of a posiwatt DR, ECU 815 controls battery 809 such that charging power requested for battery 809 is calculated and battery 809 is charged with the calculated power, based on a posiwatt DR request signal.

In starting external power supply, ECU 815 performs information exchange processing before start of power supply with EVSE 30 (controller 38), before starting external power supply. Specifically, EVSE 30 that has received a negawatt DR to BEV 10 from EMS server 100 transmits the negawatt DR to BEV 10. ECU 15 of BEV 10 that has received the negawatt DR transmits information indicating whether a response to the negawatt DR is allowed or not, information about electric power that can be supplied by battery 809, and information on the current SOC of battery 809 to EVSE 30 via communication device 816. ECU 815 also checks whether a relay (not shown) provided between battery 809 and inlet 812 is fused, before starting external power supply.

In this manner, ECU 815 performs information exchange processing and fusing diagnosis processing before starting external power supply. BEV 10 thus requires a prescribed time to start supplying power from execution of the negawatt DR by EMS server 100. BEV 10 can thus respond to the request (first request) for negawatt DR corresponding to long-cycle component L1 and the request (second request) for negawatt DR corresponding to short-cycle component L2 but fails to respond to the request (third request) for negawatt DR corresponding to extremely-short-cycle component L3.

In starting external charging, ECU 815 performs information exchange processing with EVSE 30 (controller 38) before starting external charging. Specifically, EVSE 30 that has received a posiwatt DR to BEV 10 from EMS server 100 transmits the posiwatt DR to BEV 10. ECU 815 of BEV 10 that has received the posiwatt DR transmits information indicating whether it can respond to the posiwatt DR, and battery information including a lower-limit charging voltage of battery 809, an upper-limit charging voltage of battery 809, the current SOC of battery 809, and the like to EVSE 30 via communication device 816. ECU 815 also transmits requested charging power to EVSE 30 via communication device 816. Upon receipt of the battery information and requested charging power, EVSE 30 compares the battery information and the requested charging power with its specifications, determines whether it can charge battery 809 and output the requested charging power, and then, transmits, to BEV 10, facility information including, for example, a range of voltages that can be output and a range of currents that can be output by EVSE 30. ECU 815 also checks whether a relay (not shown) provided between battery 809 and inlet 812 is fused before starting external charging.

In this manner, ECU 815 performs information exchange processing and fusing diagnosis processing before starting external charging. BEV 10 thus requires a prescribed time to start charging from execution of the posiwatt DR by EMS server 100. BEV 10 can thus respond to the request (first request) for posiwatt DR corresponding to long-cycle component L1 and the request (second request) for posiwatt DR corresponding to short-cycle component L2 but fails to respond to the request (third request) for posiwatt DR corresponding to extremely-short-cycle component L3.

<FCEV>

FIG. 5 schematically shows an overall configuration example of FCEV 20. FCEV 20 includes a receptacle 901, a hydrogen tank 902, a supply valve 903, an air filter 904, a compressor 905, an FC stack 906, a step-up converter 907, a power line 908, a battery 909, a step-down converter 910, an auxiliary load 911, outlet 912, an inverter 913, a motor generator 914, an ECU 915, and a communication device 916.

Receptacle 901 is supplied with a hydrogen fuel from a hydrogen dispenser (not shown) placed in a hydrogen station. Hydrogen tank 902 stores the hydrogen fuel supplied through receptacle 901. Supply valve 903 adjusts an amount of supply of hydrogen from hydrogen tank 902 to FC stack 906 in accordance with a control command from ECU 915.

Air filter 904 removes dust or the like in the air suctioned from the atmosphere. Compressor 905 compresses the air suctioned through air filter 904, and supplies the compressed air to FC stack 906.

FC stack 906 is, for example, a structure including a plurality of solid-polymer-type fuel cell units stacked in series. Each unit is formed by, for example, bonding catalyst electrodes to both surfaces of an electrolyte film and sandwiching the catalyst electrodes and the electrolyte film between electrically conductive separators (not shown). FC stack 906 generates electric power by an electrochemical reaction between hydrogen supplied to an anode and oxygen (air) supplied to a cathode.

Step-up converter 907 steps up the electric power generated by FC stack 906 to a high voltage (e.g., several hundred volts) in accordance with a control command from ECU 915, and outputs the stepped-up electric power to power line 908. Power line 908 electrically connects step-up converter 907 to inverter 913.

Battery 909 is electrically connected to power line 908. Battery 909 is, for example, a lithium ion battery or a nickel-hydride battery. Battery 909 stores electric power for driving motor generator 914 and supplies the electric power to inverter 913. Battery 909 also receives electric power generated by motor generator 914 during braking of FCEV 20 or the like, thereby being charged. In the present embodiment, battery 909 can function as an energy buffer that absorbs fluctuations in electric power externally supplied from FCEV 20.

Step-down converter 910 is electrically connected between power line 908 and auxiliary load 911. Step-down converter 910 steps down electric power transmitted on power line 908 to a prescribed voltage and outputs the stepped-down voltage to auxiliary load 911. Auxiliary load 911 corresponds to various devices that consume the electric power supplied from step-down converter 910 to be driven. Auxiliary load 911 may include lamps (such as a head lamp, a fog lamp, a cornering signal lamp, and a corner lamp), an audio device, a car navigation system, an antilock brake system (ABS), an oil pump, meters, a defogger, a wiper, and the like. Similarly to battery 909, auxiliary load 911 may also function as an energy buffer.

Outlet 912 is connectable with charging connector 32 provided at the tip of charging cable 31 of EVSE 30. Outlet 912 receives the electric power transmitted on power line 908 and outputs the electric power to EVSE 30. The electric power generated by FCEV 20 (FC stack 906) can thus be supplied to microgrid MG (external power supply).

Inverter 913 is electrically connected between power line 908 and motor generator 914. Inverter 913 drives motor generator 914 based on a drive signal from ECU 915. Motor generator 914 is, for example, a three-phase AC synchronous motor including a rotor with an embedded permanent magnet. Motor generator 914 is driven by inverter 813 to generate a rotational driving force. The driving force generated by motor generator 914 is transmitted to driving wheels (not shown).

Communication device 916 is configured to communicate with EVSE 30 electrically connected thereto through outlet 912.

ECU 915 includes a processor, a memory, and an I/O port, which are not shown. ECU 915 controls devices that form FCEV 20 based on a program stored in the memory and signals from various sensors. ECU 915 may be divided into a plurality of ECUs by function.

In the present embodiment, ECU 915 controls external power supply by FCEV 20 in cooperation with EMS server 100 and EVSE 30 (controller 38 of EVSE 30). ECU 915 performs external power supply based on a demand response from EMS server 100 received via EVSE 30. Specifically, upon receipt of a negawatt DR, ECU 915 controls step-up converter 907 such that output power required for FC stack 906 is calculated and FC stack 906 outputs the calculated power, based on a negawatt DR request signal.

In starting external power supply, ECU 915 performs information exchange processing with EVSE 30 (controller 38) before starting external power supply. Specifically, EVSE 30 that has received a negawatt DR to FCEV 20 from EMS server 100 transmits the negawatt DR to FCEV 20. ECU 915 of FCEV 20 that has received the negawatt DR transmits, to EVSE 30, information indicating whether it can respond to the negawatt DR and information about electric power that can be supplied by FCS 906. ECU 815 also checks whether a relay (not shown) provided between power line 908 and outlet 912 is fused before starting external power supply.

In this manner, ECU 915 performs information exchange processing and fusing diagnosis processing before starting external power supply. Similarly to BEV 10, a prescribed time is required to start power supply from execution of a negawatt DR by EMS server 100. In addition, since FCEV 20 generates electric power by an electrochemical reaction as described above, a prescribed time is required before generating electric power to be supplied. FCEV 20 can thus respond to the request (first request) for the negawatt DR corresponding to long-cycle component L1 but fails to respond to the request (second request) for the negawatt DR corresponding to short-cycle component L2 and the request (third request) for the negawatt DR corresponding to extremely-short-cycle component L3.

When EMS server 100 performs a negawatt DR, ESS 43 and generator 45 can respond to the request (first request) corresponding to long-cycle component L1, the request (second request) corresponding to short-cycle component L2, and the request (third request) corresponding to extremely-short-cycle component L3. Similarly to FCEV 20, FCS 41 can respond to the request (first request) for the negawatt DR corresponding to long-cycle component L1 but fails to respond to the request (second request) for the negawatt DR corresponding to short-cycle component L2 and the request (third request) for the negawatt DR corresponding to extremely-short-cycle component L3.

When EMS server 100 performs a posiwatt DR, FCEV 20, FCS 41, and generator 45 cannot handle a demand response, and accordingly, are excluded from targets of the posiwatt DR. When EMS server 100 performs a posiwatt DR, similarly to EVSE 30, ESS 43 can respond to the request (first request) corresponding to long-cycle component L1, the request (second request) corresponding to short-cycle component L2, and the request (third request) corresponding to extremely-short-cycle component L3.

As described above, power adjustment resources included in power adjustment resource group 500 are different from one another in the time (responsiveness) required to start a response to a DR from execution of a demand response (negawatt DR, posiwatt DR) by EMS server 100. EMS server 100 creates a DR execution plan in consideration of the responsiveness of each power adjustment resource.

Specifically, in a negawatt DR execution plan, EMS server 100 allocates FCEV 20 and FCS 41 as power adjustment resources that respond to a signal (first request signal) requesting a response to long-cycle component L1. EMS server 100 allocates BEV 10 as a power adjustment resource that responds to a signal (second request signal) requesting a response to short-cycle component L2. EMS server 100 allocates EVSE 30, ESS 43, and generator 45 as power adjustment resources that respond to a signal (third request signal) requesting a response to extremely-short-cycle component L3.

In a posiwatt DR execution plan, EMS server 100 allocates BEV 10, EVSE 30, and/or ESS 43 as power adjustment resources that respond to the first request signal. EMS server 100 allocates BEV 10 as a power adjustment resource that responds to the second request signal. EMS server 100 allocates EVSE 30 and ESS 43 as power adjustment resources that respond to the third request signal.

In this manner, a DR execution plan reflecting the responsiveness of each of power adjustment resources can be created. The present disclosure is not limited to the above example, and allocation can be changed as appropriate as long as a request signal can be responded by a power adjustment resource.

Figure 6:
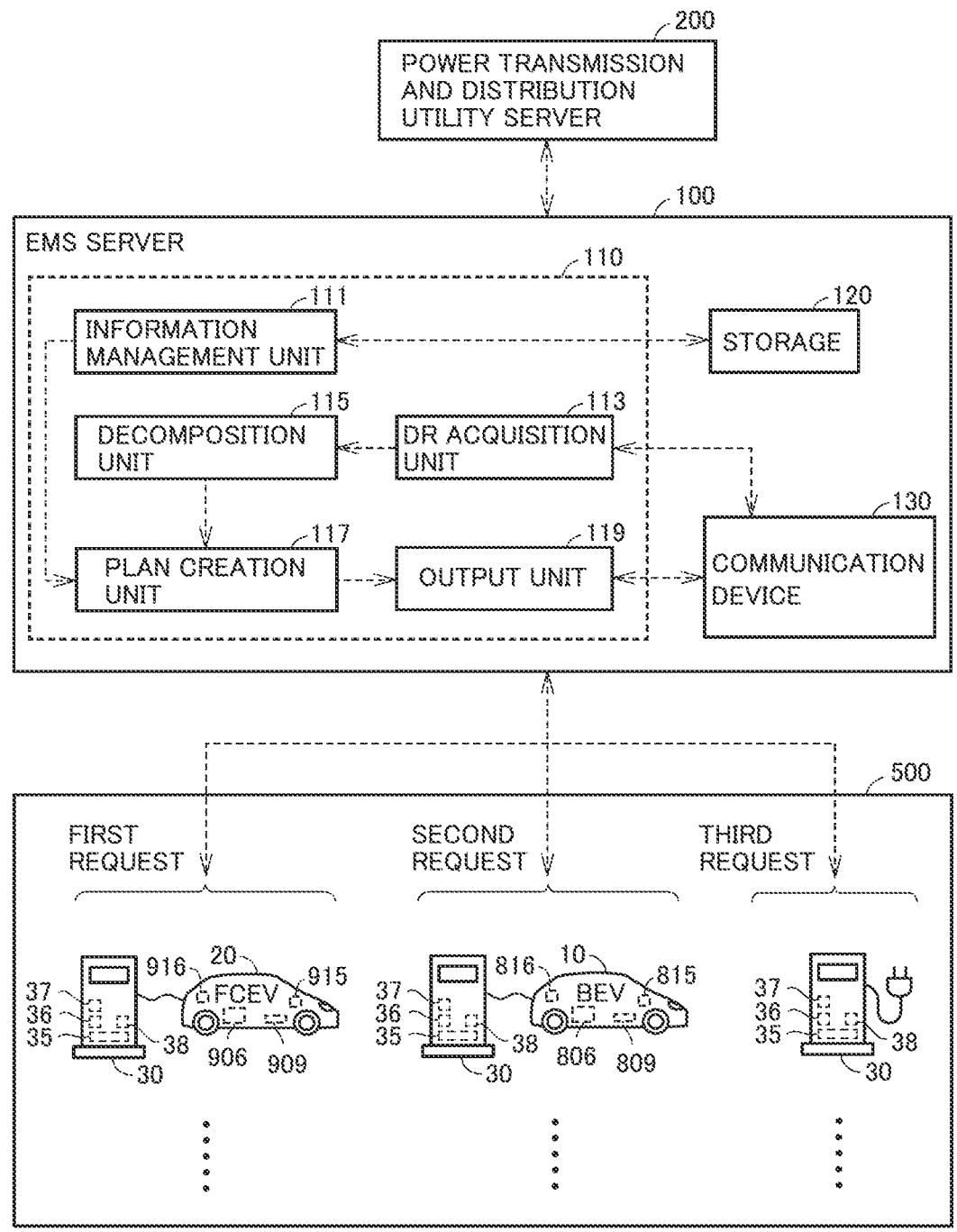
FIG. 6 is a functional block diagram showing components of an EMS server by function.

FIG. 6 is a functional block diagram showing components of EMS server 100 by function. In FIG. 6, power adjustment resources of power adjustment resource group 500 other than BEV 10, FCEV 20, and EVSE 30 are not shown. Referring to FIG. 6, controller 110 of EMS server 100 includes an information management unit 111, a DR acquisition unit 113, a decomposition unit 115, a plan creation unit 117, and an output unit 119. For example, controller 110 functions as information management unit 111, DR acquisition unit 113, decomposition unit 115, plan creation unit 117, and output unit 119 by executing a program stored in storage 120. Information management unit 111, DR acquisition unit 113, decomposition unit 115, plan creation unit 117, and output unit 119 may be implemented by, for example, dedicated hardware (electronic circuit).

Information management unit 111 is configured to manage information on each power adjustment resource (also referred to as "resource information" below) registered with EMS server 100. The resource information includes, for example, spec information and information on a remaining amount of energy of each power adjustment resource. The spec information of BEV 10 includes, for example, the capacity, electric power that can be charged and discharged, and the like of battery 809. Information on a remaining amount of energy of BEV 10 includes, for example, the SOC of battery 809. The spec information of FCEV 20 includes, for example, the capacity, electric power that can be supplied, and the like of a hydrogen tank. The information on a remaining amount of energy of FCEV 20 includes, for example, a remaining amount of hydrogen of a hydrogen tank. The spec information of EVSE 30 includes, for example, the capacity, electric power that can be charged and discharged, and the like of battery 35. The information on a remaining amount of energy of EVSE 30 includes, for example, the SOC of battery 35. The spec information of FCS 41 includes, for example, the capacity, electric power that can be supplied, and the like of a hydrogen tank. The information on an amount of a remaining amount of energy of FCS 41 includes, for example, a remaining amount of hydrogen of a hydrogen tank. The spec information of ESS 43 includes, for example, the capacity, electric power that can be charged and discharged, and the like of a battery. The information on a remaining amount of energy of ESS 43 includes, for example, the SOC of a battery. The spec information of generator 45 includes, for example, electric power that can be supplied. Identification information (ID) is allocated to each power adjustment resource, and the spec information and the information on a remaining amount of energy are associated with the identification information to be stored in storage 120. Information management unit 111 obtains the information on a remaining amount of energy of each power adjustment resource via communication device 130 and stores it in storage 120, for each prescribed cycle.

DR acquisition unit 113 obtains a DR request from power transmission and distribution utility server 200 via communication device 130. DR acquisition unit 113 determines whether the obtained DR request is a negawatt DR or a posiwatt DR. DR acquisition unit 113 outputs the obtained DR request to decomposition unit 115.

Decomposition unit 115 decomposes the DR request to a long-cycle component, a short-cycle component, and an extremely-short-cycle component. Decomposition unit 115 outputs, to plan creation unit 117, information including a first request that is a request corresponding to the long-cycle component, a second request that is a request corresponding to the short-cycle component, and a third request that is a request corresponding to the extremely-short-cycle component.

Plan creation unit 117 creates a DR execution plan. Plan creation unit 117 outputs the created DR execution plan to output unit 119.

Specifically, when creating a negawatt DR execution plan, plan creation unit 117 allocates FCEV 20 and FCS 41 as power adjustment resources that respond to the first request signal. Plan creation unit 117 may preferentially allocate FCEV 20 and FCS 41 among BEV 10, FCEV 20, EVSE 30, FCS 41, ESS 43, and generator 45 as power adjustment resources that respond to the first request signal. When power adjustment resources that respond to the first request signal are insufficient only by allocation of FCEV 20 and FCS 41, at least any of BEV 10, EVSE 30, ESS 43, and generator 45 may be allocated as a power adjustment resource that responds to the first request signal. Plan creation unit 117 allocates BEV 10 as a power adjustment resource that responds to the second request signal. Plan creation unit 117 may preferentially allocate BEV 10 among BEV 10, EVSE 30, ESS 43, and generator 45 as a power adjustment resource that responds to the second request signal. When the power adjustment resource that responds to the second request signal is insufficient only by allocation of BEV 10, at least any of EVSE 30, ESS 43, and generator 45 may be allocated as a power adjustment resource that responds to the second request signal. Plan creation unit 117 allocates EVSE 30, ESS 43, and generator 45 as power adjustment resources that respond to the third request signal.

When creating a posiwatt DR execution plan, plan creation unit 117 allocates BEV 10, EVSE 30, and/or ESS 43 as power adjustment resources that respond to the first request signal. Plan creation unit 117 allocates BEV 10 as a power adjustment resource that responds to the second request signal. Plan creation unit 117 may preferentially allocate BEV 10 among BEV 10, EVSE 30, and ESS 43 as a power adjustment resource that responds to the second request signal. When the power adjustment resource that responds to the second request signal is insufficient only by allocation of BEV 10, at least any of EVSE 30 and ESS 43 may be allocated as a power adjustment resource that responds to the second request signal. Plan creation unit 117 allocates EVSE 30 and ESS 43 as power adjustment resources that respond to the third request signal.

Output unit 119 outputs the request signals (first to third request signals) to power adjustment resources in accordance with an execution plan.

<Process Performed by EMS Server>

Figure 7:
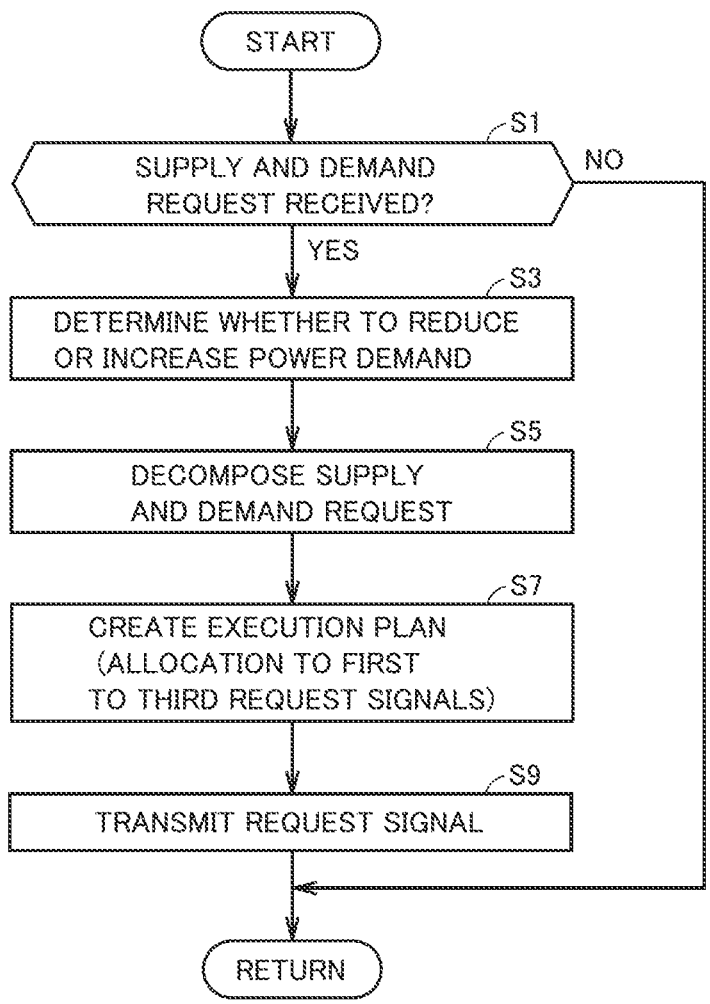
FIG. 7 is a flowchart showing a procedure of a process performed by an EMS server upon receipt of a supply and demand request.

FIG. 7 is a flowchart showing a procedure of a process performed by EMS server 100 when receiving a supply and demand request. The process of the flowchart shown in FIG. 7 is performed repeatedly by controller 110 of EMS server 100 for each prescribed control cycle. Although description will be given to a case where each step (a step will be abbreviated as "S" below) of the flowchart shown in FIG. 7 is implemented through software processing by controller 110, some or all of steps may be performed by hardware (electronic circuit) formed in controller 110.

At S1, controller 110 determines whether it has received a supply and demand request from power transmission and distribution utility server 200. When having received no supply and demand request (NO at S1), controller 110 moves the process to RETURN. When having received a supply and demand request (YES at S1), controller 110 moves the process to S3.

At S3, controller 110 determines whether the DR request is for requesting a reduction in power demand or an increase in power demand.

At S5, controller 110 then decomposes the DR request. Controller 110 decomposes the DR into a long-cycle component, a short-cycle component, and an extremely-short-cycle component, and generates first to third requests.

At S7, controller 110 creates a DR execution plan. When determining that the DR request is for requesting a reduction in power demand at S3, controller 110 creates a negawatt DR execution plan. When determining that the DR request is for requesting an increase in power demand at S3, controller 110 creates a posiwatt DR execution plan. In creation of an execution plan, controller 110 allocates power adjustment resources to the first to third requests in consideration of the responsiveness of each power adjustment resource.

At S9, controller 110 outputs the request signals (first to third request signals) to power adjustment resources in accordance with the execution plan created at S7.

As described above, EMS server 100 according to the present embodiment decomposes a DR request into a long-cycle component, a short-cycle component, and an extremely-short-cycle component, and generates first to third requests. EMS server 100 then allocates power adjustment resources to the first to third requests in consideration of the responsiveness of each power adjustment resource. For example, BEV 10 can respond to the first request corresponding to the long-cycle component and the second request corresponding to the short-cycle component. FCEV 20 can respond to the first request corresponding to the long-cycle component. EVSE 30 can respond to the first request corresponding to the long-cycle component, the second request corresponding to the short-cycle component, and the third request corresponding to the extremely-shortcycle component. EMS server 100 creates an execution plan such that a request that can be responded is made to each power resource.

In this manner, BEV 10, FCEV 20, and EVSE 30 can be utilized as power adjustment resources to a DR by creasing a DR execution plan in consideration of the responsiveness of each of the power adjustment resources (in particular, BEV 10, FCEV 20, and EVSE 30). Thus, supply and demand of power grid PG can be stabilized further.

[Variation]

The present embodiment has described an example in which electric power system 1 includes FCEV 20 configured to perform external power supply. FCEV may be configured to perform external charging of charge battery 35 using electric power supplied from outside of the vehicle, in addition to external power supply. When external charging of the FCEV is allowed, the FCEV can be utilized as the power adjustment resource in posiwatt DR.

In starting external charging, the FCEV capable of external charging performs information exchange processing before starting charging with EVSE 30 (controller 38) for a battery mounted on the FCEV. Further, the FCEV checks whether a relay (not shown) is fused before starting external charging.

Specifically, the FCEV performs information exchange processing and fusing diagnosis processing before starting external power supply. A prescribed time is thus required to start charging from execution of a posiwatt DR by EMS server 100. Similarly to BEV 10, the FCEV can thus respond to the request (first request) for a posiwatt DR corresponding to long-cycle component L1 and the request (second request) for posiwatt DR corresponding to short-cycle component L2 but fails to respond to the request (third request) for posiwatt DR corresponding to extremely-short-cycle component L3.

Supply and demand of power grid PG can be stabilized further by utilizing an FCEV capable of external charging as a power adjustment resource to a DR in consideration of the responsiveness described above.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. An electric power system comprising:
   a plurality of power adjustment resources electrically connectable to a power network; and
   a power management apparatus that performs a demand response requesting adjustment of power supply and demand to the power network in response to a supply and demand request from a power grid, wherein
   the power management apparatus decomposes the supply and demand request into a first request signal and a second request signal higher in frequency than the first request signal,
   the power management apparatus allocates power adjustment resources that respond to the first request signal and the second request signal in accordance with responsiveness of each of the plurality of power adjustment resources to the demand response,
   the plurality of power adjustment resources include a battery electric vehicle, a fuel cell electric vehicle, and a charging facility,
   the battery electric vehicle and the fuel cell electric vehicle are electrically connected to the power network via the charging facility,
   the battery electric vehicle includes a first battery and is configured to supply electric power to the power network and receive electric power from the power network by charging and discharging of the first battery,
   the fuel cell electric vehicle includes a hydrogen power generation system and is configured to supply electric power to the power network by power generation by the hydrogen power generation system,
   when the supply and demand request is for requesting a reduction in power demand, the power management apparatus allocates the fuel cell electric vehicle as a power adjustment resource that responds to the first request signal and allocates the battery electric vehicle as a power adjustment resource that responds to the second request signal,
   the charging facility includes a second battery and is configured to supply electric power to the power network and receive electric power from the power network by charging and discharging of the second battery,
   the power management apparatus decomposes fluctuations in power demand of the power grid into the first request signal, the second request signal, and a third request signal higher in frequency than the second request signal, and
   when the supply and demand request is for requesting a reduction in power demand, the power management apparatus allocates the fuel cell electric vehicle as a power adjustment resource that responds to the first request signal, allocates the battery electric vehicle as a power adjustment resource that responds to the second request signal, and allocates the charging facility as a power adjustment resource that responds to the third request signal.

2. The electric power system according to claim 1, wherein
   the fuel cell electric vehicle further includes a third battery and is configured to receive electric power from the power network by charging of the third battery, and
   when the supply and demand request is for requesting an increase in power demand, the power management apparatus allocates the battery electric vehicle and the fuel cell electric vehicle as power adjustment resources that respond to the first request signal and the second request signal, and allocates the charging facility as a power adjustment resource that responds to the third request signal.

* * * * *